United States Patent [19]

Fehlig

[11] Patent Number: 5,067,591
[45] Date of Patent: Nov. 26, 1991

[54] COMBINATION AIR/MANUAL ECONOMY GREASE DISPENSER

[75] Inventor: Kenneth L. Fehlig, Chesterfield, Mo.

[73] Assignee: Pentair, Incorporated, St. Paul, Minn.

[21] Appl. No.: 434,855

[22] Filed: Nov. 9, 1989

[51] Int. Cl.⁵ .............................................. F16N 7/30
[52] U.S. Cl. .................................... 184/55.1; 184/29; 184/36; 184/42; 141/21; 141/382; 141/383; 141/387; 222/258; 222/389
[58] Field of Search .................. 184/28, 29, 36, 39, 184/41, 42, 45.1, 55.1, 105.1, 105.2, 6.26; 222/258, 261, 262, 263, 389, 380, 385; 141/21, 25-28, 382, 383, 387

[56] References Cited

U.S. PATENT DOCUMENTS

| | | | |
|---|---|---|---|
| 1,499,642 | 7/1924 | Craig | 141/26 |
| 1,559,894 | 11/1925 | Lansing | 184/29 |
| 1,714,254 | 12/1924 | Zerk | 222/259 |
| 1,743,968 | 1/1930 | Hatfield | 222/263 |
| 1,924,068 | 8/1933 | Gleason | 184/28 |
| 1,945,813 | 2/1934 | Johnson | 222/258 |
| 2,099,959 | 11/1937 | Johnson | 222/258 |
| 2,114,509 | 4/1938 | Stoll | 222/261 |
| 2,242,288 | 5/1941 | Davis | 222/263 |
| 2,459,010 | 1/1949 | Williams | 222/263 |
| 2,630,248 | 3/1953 | Hinz | 222/258 |
| 2,928,574 | 3/1960 | Wagner | 222/263 |
| 3,829,025 | 8/1974 | McLeod | 141/27 |
| 4,109,831 | 8/1978 | Culpepper et al. | 222/263 |
| 4,157,773 | 6/1979 | Schetina et al. | 222/263 |
| 4,588,002 | 5/1986 | Braddock et al. | 141/383 |
| 4,676,409 | 6/1987 | Stolz | 184/105.1 |
| 4,790,456 | 12/1988 | Nakane et al. | 222/259 |

OTHER PUBLICATIONS

Operating Instructions, Parts and Service Series "C", Model 1297.
Lincoln Service Instructions for air grease gun, Form 411840.

Primary Examiner—Ira S. Lazarus
Assistant Examiner—Alan B. Cariaso
Attorney, Agent, or Firm—Rogers, Howell & Haferkamp

[57] ABSTRACT

A combined pneumatic and manual grease dispensing system comprises a manually operated fluid pump that draws lubricant from a source and delivers the lubricant at a first fluid pressure, and a pneumatically operated lubricant dispensing gun that receives the lubricant supplied by the manual pump at the first pressure and receives a supply of compressed air from a compressed air source, and dispenses the lubricant received at a second pressure substantially increased from the first pressure at which the lubricant is supplied to the gun.

18 Claims, 1 Drawing Sheet

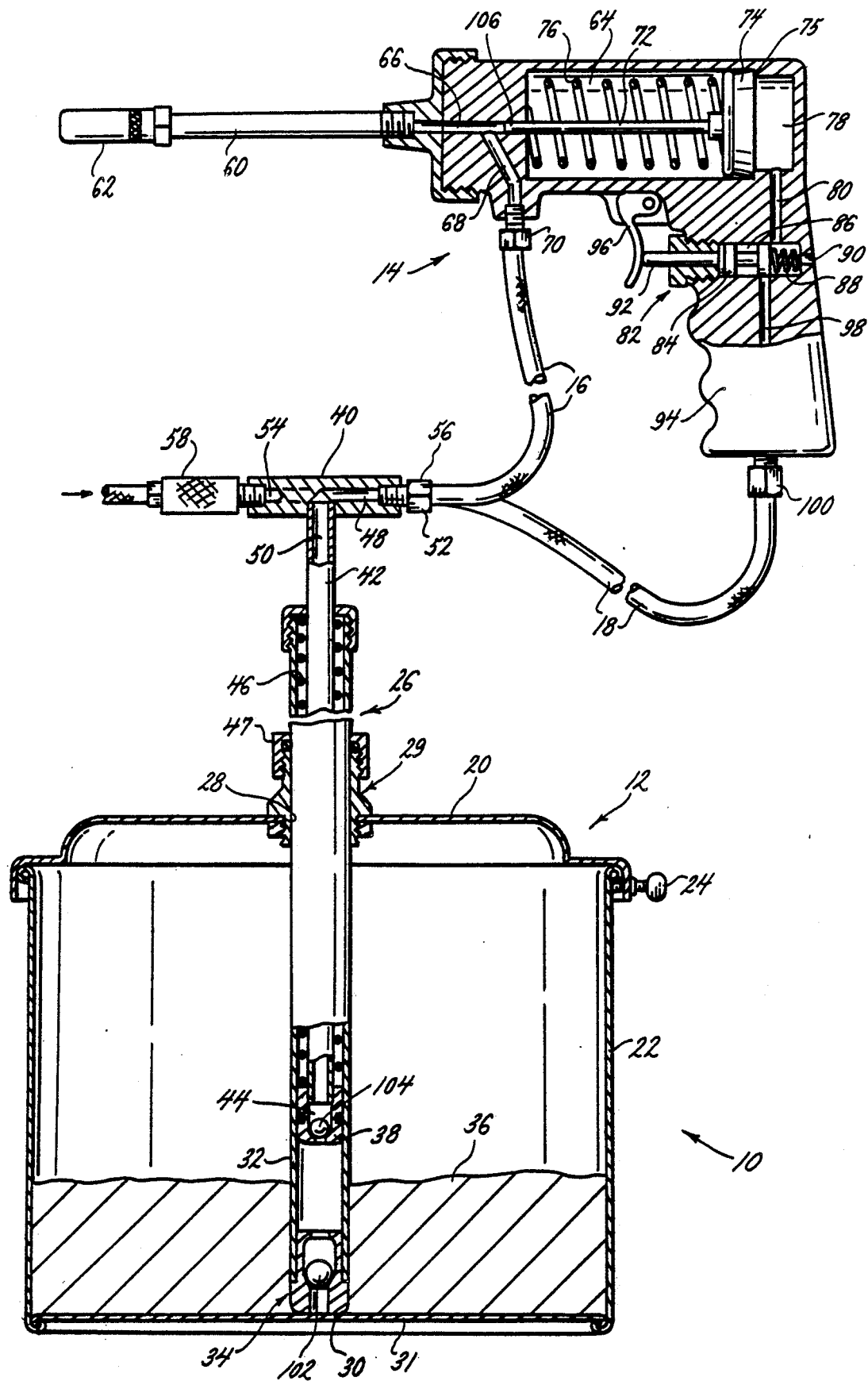

COMBINATION AIR/MANUAL ECONOMY GREASE DISPENSER

BACKGROUND OF THE INVENTION (1) Field of the Invention

The present invention relates to a grease dispensing system comprising a manually powered pump and a compressed air powered pump, in particular a system that comprises a manually primed pump that supplies grease to the system and a compressed air powered pump that dispenses grease from the system.

(2) Description of the Related Art

Grease dispensing systems of the type provided by the present invention come in a variety of types and sizes. One type of conventional grease dispensing system is the bucket pump pressure dispensing system. This system includes a manually primed pump secured to a circular drum cover. The drum cover is adapted to be attached over the opening of a cylindrical lubricant storage container, with a bottom end of the pump extending into and adjacent the bottom of the container.

With the drum cover secured in place, a manual handle at the top of the pump is pulled upward by an operator. This causes a piston in a pump cylinder to withdraw from the cylinder, resulting in the lubricant in the container being drawn into the volume created in the cylinder by the withdrawing piston. When the handle reaches the limit of its extraction from the pump cylinder, it is released by the operator and the piston is spring-biased back into the cylinder. The spring force of the piston moving back into the cylinder causes the lubricant now filling the cylinder to displace a one-way check valve in the piston and to flow past the check valve and through a conduit extending through the pump piston.

A delivery hose is attached to the manual handle of the pump and is in fluid communication with the piston conduit. The lubricant forced into the piston conduit travels through the conduit and the attached delivery hose. The lubricant is then conveyed through the hose to a manually operated booster valve at the opposite end of the hose.

The booster valve includes a lubricant dispensing barrel, a plunger mechanism that reciprocates through the barrel, and a manually operated lever that controls the reciprocation of the plunger. With the lever at an atrest position, the lubricant conveyed through the hose is supplied to the booster valve and fills an area at an entrance end of the barrel. When the manual lever is depressed by the operator to its fully closed position, the plunger is caused by the movement of the lever to slide through the entrance portion of the barrel forcing the lubricant supplied to the barrel to pass through and be dispensed from the barrel. The manual pumping of the lever by the operator of the booster valve develops a high pumping pressure in the lubricant being dispensed through the valve barrel. However, the operator must repeatedly manually pump the lever in order to dispense large quantities of the lubricant from the booster valve barrel.

A second type of conventional grease dispensing system is the air/grease gun. The air/grease gun comprises a barrel that is fed with lubricant and a plunger that reciprocates through the barrel to force the lubricant through the barrel from the force of compressed air supplied to the gun and to dispense the lubricant from the barrel. The air/grease gun is not supplied with grease through a hose from a lubricant bucket, but rather is supplied from a container tube attached to the air/grease gun.

The container tube includes a spring-biased piston that forces lubricant from the tube into an area at the entrance end of the air/grease gun barrel. A piston is attached to the end of the plunger opposite the end that reciprocates through the entrance area of the barrel. The piston is spring-biased to an at-rest position in a compressed air cylinder.

The air/grease gun is supplied with compressed air through a hose connection, and selective operation of a trigger valve by an operator supplies compressed air to the cylinder causing the piston to move against the spring bias. The movement of the piston causes the plunger to move through the entrance of the barrel, forcing the lubricant through the barrel. The plunger forcing the lubricant through the barrel develops a high pumping pressure of lubricant from the air/grease gun with much less operator effort than is involved in pumping lubricant from the booster valve of the bucket pump systems.

However, the container tube of lubricant attached to the air/grease gun makes the gun awkward to operate. The dimensions of the container tube containing the lubricant supply prevent the air/grease gun from gaining access to even slightly confined areas. In addition, the weight of the lubricant contained in the tube adds substantially to the overall weight of the air/grease gun, and the supply of lubricant is small and must be frequently replenished.

It is an object of the present invention to provide a lubricant dispensing system that combines the beneficial features of both the pump bucket dispensing systems and the air/grease gun dispensing systems while eliminating the undesirable features of the two systems.

The objectives are achieved by providing a combined air/manual lubricant dispensing system that combines the increased lubricant supply and the lubricant dispenser flexibility of the manual bucket pump and booster valve system with the effortless lubricant dispensing operation of the compressed air/grease gun.

SUMMARY OF THE INVENTION

The air/manual economy grease dispenser of the present invention provides a unique combination of a manual bucket pump lubricant dispensing system and a compressed air/grease gun lubricant dispensing system.

The manual bucket pump serves as the lubricant supply in the lubricant dispensing system of the present invention. The bucket pump includes a cover adapted to be installed over an opening of a lubricant container. The manual pump is cylindrical in shape and is secured to the cover. With the cover secured to the lubricant container, one end of the pump extends into the lubricant and rests on the bottom of the container.

A manual handle is provided at the opposite end of the pump. The handle is connected to a piston rod and piston that extend into the cylinder of the pump. As the handle and attached piston are retracted up out of the pump cylinder, the volume in the cylinder evacuated by the piston fills with lubricant from the container. When the handle and piston rod have been retracted from the cylinder to their maximum extent, the operator releases the handle and a spring biasing the piston rod in the cylinder causes the piston to extend back into the cylinder. The piston moving back into the cylinder creates a fluid pressure in the lubricant filling the cylinder. The fluid pressure in the lubricant causes the lubricant to displace and flow past a check valve in the piston, and to flow through a fluid conduit through the center of the piston and piston rod to the manual handle.

The handle is provided with a connecting element for a flexible fluid hose. The lubricant forced by the piston through the piston fluid conduit and the handle is conveyed through the fluid hose. The flexible fluid hose is connected at its opposite end to a lubricant inlet of the air/grease gun of the lubricant dispensing system of the present invention.

The lubricant dispensing air/grease gun of the present system is similar to conventional air/grease guns except that the lubricant container tube of conventional air/grease guns is not present and is replaced by a lubricant inlet connection to which the flexible fluid hose is attached. Lubricant supplied under pressure from the manual bucket pump is conveyed through the flexible fluid hose to the lubricant inlet of the air/grease gun. The air/grease gun is also provided with a second inlet connection for the supply of compressed air to the air/grease gun. The second inlet connection is adapted to be coupled to an end of a flexible fluid pressure hose that is connected to a compressed air source at its opposite end. The pressurized lubricant is supplied to an area at the entrance of the air gun barrel from the first inlet. By selective operation of a trigger valve mechanism, compressed air is supplied to the piston cylinder of the gun, displacing the piston against the spring bias and forcing the plunger through the gun barrel. The movement of the plunger through the barrel forces the lubricant through the barrel. Due to the difference in the effective areas of the plunger forcing the lubricant through the barrel and the piston exposed to the compressed air, the lubricant is dispensed from the barrel of the air gun at a pressure that is substantially increased from the pressure at which the lubricant was supplied from the bucket pump to the air gun.

An additional conduit for the compressed air hose is provided in the handle of the bucket pump. One end of this conduit is adapted to be connected to the opposite end of the flexible fluid pressure hose attached to the second inlet of the air gun, and the opposite end of the conduit is adapted to be connected to a compressed air source. Providing connections for both of the flexible hoses that convey lubricant and compressed air in the handle of the bucket pump avoids tangling of the hoses and provides increased flexibility in manipulating the air/grease gun.

BRIEF DESCRIPTION OF THE DRAWINGS

Further objects and features of the present invention are revealed in the following detailed description of the preferred embodiment of the invention and in the drawing figure wherein:

FIG. 1 is a elevation view in section of the combination air/manual economy grease dispenser of the present invention.

DESCRIPTION OF THE PREFERRED EMBODIMENT

FIG. 1 shows the combined air/manual economy grease dispensing system 10 of the present invention. The system includes the combination of a manual bucket pump assembly 12 and a pneumatic grease gun assembly 14. The bucket pump assembly 12 is in fluid communication with the grease gun assembly 14 by a flexible fluid pressure hose 16, and the grease gun assembly 14 is in fluid communication with a compressed air source (not shown) by the flexible fluid pressure hose 18.

The bucket pump assembly 12 comprises a circular bucket or drum cover 20 that is dimensioned to fit snugly over the top opening of a conventional lubricant bucket or drum container 22. A plurality of threaded hand screws 24 are provided around the peripheral edge of the bucket cover 20 to be hand-tightened down by the operator to secure the bucket cover 20 in position over the opening of the lubricant container 22. A cylindrical, manually primed pump 26 extends through a center hole 28 in the bucket cover 20 and is secured in place by a threaded fastener assembly 29. With the cover 20 secured in place over the opening of the lubricant container 22, the fastener assembly 29 is loosened to permit the vertical adjustment of the pump 26 relative to the container 22. The pump 26 is inserted through the loosened fastener until its bottom end 30 contacts the bottom 31 of the container, and then fastener 29 is retightened to secure the pump in place.

The pump 26 comprises a cylindrical body 32 with a one-way check valve 34 at the bottom of the body 32 that provides one-way communication between the lubricant 36 contained in the bucket container 22 and the interior of the cylindrical body 32. A reciprocating piston 38 is slidably received in the interior of the cylindrical pump body 32. The piston 38 is connected to a manual handle 40 by a hollow piston rod 42. A check valve 44 is also provided in the piston 38 and provides one-way fluid communication between the interior of the cylinder 32 and the interior of the hollow piston rod 42. A spring 46 biases the piston 38 and the piston rod 42 downward into the interior of the cylindrical pump body 32. The spring, piston, and piston rod are held assembled in the interior of the cylinder 32 by a threaded cap 47 at the top of the threaded fastener assembly 29.

A first fluid conduit 48 extends through the manual handle 40 and communicates the interior bore 50 of the hollow piston rod 42 with a first fluid pressure hose connecting element 52 on one end of the handle 40. A second fluid conduit 54 also extends through the handle 40 parallel to the first conduit 48 and communicates a second hose connecting element 56 with a compressed air inlet element 58 adapted to be connected to a source of pressurized air (not shown).

The grease gun assembly 14 comprises a hollow barrel 60 with a one-way check valve 62 positioned at a distal end of the barrel that permits the dispensing of lubricant from the barrel while preventing foreign substances from re-entering the barrel. The opposite end of the barrel communicates with a first cylindrical chamber 64 inside the gun assembly 14. The interior bore 66 of the barrel 60 communicates with a conduit 68 proximate to its end opening into the chamber 64. The conduit 68 is in fluid communication with a lubricant inlet fitting 70 of the gun to which is attached the flexible fluid pressure hose 16 in fluid communication with the first conduit 48 of the bucket pump assembly 12.

A plunger 72 is slidably received in the barrel bore 66 and extends into the gun chamber 64 where it is connected to a piston 74. The piston 74 is slidably received in the chamber 64 and is biased to a first end 75 of the chamber by the spring 76 as seen in FIG. 1. A second chamber 78 that is an extension of the first chamber 64 but sized smaller than the piston 74 communicates through a fluid conduit 80 with a two-position valve assembly 82.

The valve assembly 82 comprises a valve spool 84 slidably received in a cylindrical valve chamber 86. The valve spool 84 is biased to a first position to the left of the chamber 86 as shown in FIG. 1 by the spring 88. In this position of the valve spool 84, the second chamber 78 is vented through the fluid conduit 80, the valve chamber 86, and the exit vent 90, and the spring 76 forces the piston 74 to the right end 75 of the first chamber 64. A pin member 92 projects out of the gun handle 94 from an end of the valve spool 84 opposite the spring 88. A manually operated triggering assembly 96 is operatively connected to the pin 92 to displace the pin and the valve spool 84 in the valve chamber 86 on depression of the trigger assembly. When the trigger assembly 96 is depressed by an operator, the pin 92 is forced into the handle 94 of the gun, displacing the valve spool 84 to the right toward the biasing spring 88 and communicating the fluid conduit 80 with the fluid conduit 98 through the valve chamber 86.

The conduit 98 is in fluid communication with the fluid pressure hose 18 connected to the gun assembly 14 at the fluid inlet fitting 100. The hose 18 is connected at its opposite end to the hose connecting element 56 of the manual pump handle 40 which communicates through the conduit 54 with the compressed air source connected to the element 58, thereby providing fluid communication between the hose 18 and the source of pressurized air (not shown).

In operation, the user of the combined air/manual grease dispensing system 10 first pulls upward on the manual pump handle 40 causing the piston rod 42 and the piston 38 to be retracted upward through the interior bore of the cylindrical pump body 32. This creates a vacuum in the interior of the pump body 32, and the vacuum created together with the pressure head of the lubricant 36 contained in the lubricant container 22 causes the ball 102 of the check valve 34 to be displaced upwardly as shown in FIG. 1, enabling the flow of lubricant 36 from the container 22 into the void in the interior bore of the cylindrical body 32 left by the retracting piston 38. It is preferred that the piston 38 be retracted by the user slowly, in order for high viscous lubricants to completely fill the void left by the retracting piston 38 in the interior of the cylindrical pump body 32. Once the manual handle 40 has been retracted upward to its maximum extent, it is released by the user causing the spring 46 to bias the piston 38 back into the interior of the cylindrical pump body 32 and creating a fluid pressure in the lubricant now filling the interior bore of the pump body 32. The pressure created in the lubricant causes the ball 104 of the piston check valve 44 to be displaced upwardly, permitting the flow of lubricant past the ball 104 and into the interior bore 50 of the piston rod 42.

The pressurized lubricant flows through the interior bore 50 of the piston rod 42, the conduit 48 in the pump handle 40, the hose connecting element 52, the flexible fluid pressure hose 16, the inlet fitting 70 of the grease gun assembly 14, the conduit 68 and into the interior bore 66 of the grease gun barrel 60. The pressure of the lubricant in the bore 66 is insufficient to unseat the check valve 62 at the end of the barrel 60, and lubricant will not flow from the barrel until its pressure is sufficiently increased.

Compressed air supplied from a compressed air source (not shown) is supplied to the hose connecting element 58 on one side of the manual handle 40 of the bucket pump assembly 12. This pressurized air is communicated through the conduit 54, the hose connecting element 56, the flexible fluid pressure hose 18, the pressure inlet fitting 100 of the grease gun assembly 14, the conduit 98 through the handle 94 of the grease gun, to the trigger valve assembly 82.

In the position shown in FIG. 1, the trigger valve assembly 84 is not depressed by the operator and the valve spool 84 interrupts fluid communication between the conduits 98 and 80, and permits fluid communication between the second chamber 78 and the atmosphere through the conduits 80, the valve chamber 86, and the vent conduit 90. On depression of the trigger 96 by the operator, the valve spool 84 is displaced to the right, as shown in the drawing figure, against the bias of the spring 88. This movement of the valve spool interrupts communication between the conduit 80 and the vent conduit 90, and establishes communication between the conduits 98 and 80. The pressurized air supplied to the conduit 98 is now supplied through the valve chamber 86, and the conduit 80, to the second pressure chamber 78 of the grease gun assembly.

The compressed air supplied to the second chamber 78 causes the piston 74 to be displaced to the left, as seen in the drawing figure, against the bias of the spring 76. The leftward movement of the piston 74 results in the connected plunger 72 being displaced to the left through the interior bore 66 of the barrel 60. When the distal end 106 of the plunger has moved past the conduit opening communicating the conduit 68 with the barrel interior bore 66, continued leftward movement of the plunger 72 causes the lubricant supplied to the interior bore 66 of the barrel 60 from the bucket pump assembly 12 to increase in fluid pressure.

When the fluid pressure in the barrel 60 reaches a magnitude sufficient to overcome the one-way check valve 62, the lubricant contained in the interior bore 66 of the barrel 60 will be dispensed from the distal end of the barrel at a pressure significantly increased from the fluid pressure at which the lubricant was supplied to the grease gun assembly 14 from the bucket pump assembly 12.

On release of the trigger assembly 96 by the operator, the valve spool 84 will return to its leftward position shown in the drawing figure by the bias of the spring 88. This interrupts the communication of compressed air from the conduit 98 to the conduit 80 and the second chamber 78, and vents the chamber 78 through the conduits 80 and 90 to the atmosphere. The decrease in the pressure of the compressed air supplied to the second chamber 78 causes the piston 74 to move to the right through the chamber 64 by the force of the spring 76. The rightward movement of the piston 74 causes the plunger 72 to be retracted from the interior bore 66 of the barrel 60. When the plunger 72 has retracted past the connection with the conduit 68 to a sufficient extent, fluid communication is once again established between the conduit 68 and the interior bore 66. This permits the lubricant supplied under pressure from the bucket pump assembly 12 to flow through the flexible fluid pressure hose 16, the conduit 68, and into the void in the interior bore 66 of the barrel 60 left by the most recently dispensed quantity of lubricant from the gun 14.

By the above described manual operation of the trigger of the grease gun assembly 14, the operator can continuously dispense incremental quantities of lubricant from the gun assembly 14 at a fluid pressure that is substantially increased from the fluid pressure of the lubricant supplied to the gun from the bucket pump assembly 12. When the spring 46 forces the piston 38 of the pump completely to the bottom of the interior bore of the cylinder 32, the operator need only pull upward on the handle 40 to refill the interior of the cylinder 32 with lubricant and reestablish the flow of lubricant through hose 16 to the grease gun.

While the present invention has been described by reference to a specific embodiment, it should be understood that modifications and variations of the invention may be constructed without departing from the scope of the invention defined in the following claims.

What is claimed is:

1. A fluid dispensing system comprising:
   a self contained fluid pump adapted to be placed in fluid communication with a source of fluid, and adapted to both draw fluid from the source and deliver the fluid at a first pressure;
   a first fluid communication means adapted to receive the fluid delivered by the fluid pump and to conduct flow of the fluid;
   a second fluid communication means adapted to receive compressed air from a compressed air source and to conduct flow of the compressed air;
   a fluid dispensing means adapted to receive fluid at the first pressure from the first fluid communication means and compressed air from the second fluid communication means and to selectively dispense a predetermined quantity of the fluid at a second pressure;
   the fluid pump being a manually primed pump having a cylinder with a manually displaceable piston slidably received in the cylinder and a spring between the piston and cylinder, the piston being adapted to be manually displaced against the spring bias to a first position to draw fluid into the cylinder and prime the pump, and the piston being adapted to be displaced to a second position by the bias of the spring to force fluid drawn into the cylinder out of the cylinder and into the first fluid communication means.

2. The dispensing system of claim 1 comprising:
   the second pressure being greater than the first pressure.

3. The dispensing system of claim 1 comprising:
   the fluid being a lubricant.

4. The dispensing system of claim 1 comprising:
   the fluid pump being adapted to be securely attached to the source of fluid.

5. The dispensing system of claim 1 comprising:
   a fluid conduit passing through the center of the piston and in fluid communication with the first fluid communication means, the conduit being adapted to conduct the fluid forced out of the cylinder by the piston to the first fluid communication means.

6. The dispensing system of claim 4 comprising:
   the fluid pump being secured to a cover assembly, the cover assembly being adapted to be securely attached to a source of fluid contained in a container.

7. The dispensing system of claim 1 comprising:
   the first fluid communication means including a first hose communicating the fluid pump with the dispensing means; and the second fluid communication means including a second hose adapted to communicate a source of compressed air with the dispensing means.

8. The dispensing system of claim 5 comprising:
   the first fluid communication means including a hose, the hose being connected for fluid communication with the fluid conduit at one end and connected for fluid communication with the fluid dispensing means at an opposite end.

9. The dispensing system of claim 1 comprising:
   the fluid dispensing means including a first pressure inlet adapted to receive fluid at the first pressure from the first fluid communication means, and a second pressure inlet adapted to receive compressed air from the second fluid communication means.

10. The dispensing system of claim 7 comprising:
    the fluid dispensing means including a first inlet adapted to be attached in fluid communication with the first hose, and a second inlet adapted to be attached in fluid communication with the second hose.

11. The dispensing system of claim 1 comprising:
    the fluid dispensing means having a chamber adapted to be selectively supplied with compressed air from the second fluid communication means; a piston slidably received in the chamber and spring-biased toward a first end of the chamber, the piston being adapted to slide to a second end of the chamber against the spring bias on selective supply of compressed air to the chamber; a barrel adapted to be supplied with fluid at the first pressure from the first fluid communication means; and a plunger connected to the piston and slidably received in the barrel, the plunger being adapted to force fluid supplied to the barrel out of the barrel at the second pressure when compressed air is selectively supplied to the chamber.

12. The dispensing system of claim 11 comprising:
    the fluid dispensing nozzle including a manually operable trigger valve adapted to selectively supply compressed air from the second fluid communication means to the chamber.

13. A combined pneumatic/manual fluid dispensing system comprising:
    a self contained manual fluid pump adapted to both draw fluid from a fluid source and supply the fluid drawn at a first pressure;
    a pneumatic fluid dispenser adapted to receive fluid at the first pressure supplied by the manual fluid pump and to receive compressed air from a compressed air source, and adapted to dispense the fluid received at a second pressure, greater than the first pressure; the fluid pump being a manually primed pump having a cylinder with a manually displaceable piston slidably received in the cylinder and a spring between the piston and cylinder, the piston being adapted to be manually displaced against the spring bias to a first position to draw fluid into the cylinder and prime the pump, and the piston being adapted to be displaced to a second position by the bias of the spring to force fluid drawn into the cylinder out of the cylinder and into the first fluid communication means.

14. The fluid dispensing system of claim 13 comprising:
    a first hose connected between the manual fluid pump and the pneumatic dispenser to convey the fluid supplied by the manual fluid pump to the pneumatic dispenser; and
    a second hose connected to the pneumatic dispenser and adapted to be connected to a compressed air source to supply compressed air to drive the pneumatic dispenser.

15. The fluid dispensing system of claim 13 comprising:

the manual fluid pump including a cylinder with a biased piston slidably received in the cylinder, the piston being adapted to be manually retracted from the cylinder to fill the cylinder with fluid drawn from the fluid source, and to be biased back into the cylinder to force the drawn fluid out of the cylinder at the first pressure.

16. The fluid dispensing system of claim 13 comprising:

the pneumatic dispenser including a barrel adapted to receive the fluid supplied by the manual fluid pump, and a plunger slidably received in the barrel, the plunger being adapted to selectively slide through the barrel and forcibly dispense from the barrel fluid received by the barrel, the fluid being dispensed from the barrel at the second pressure, greater than the first pressure.

17. The fluid dispensing system of claim 16 comprising:

the pneumatic dispenser including a chamber adapted to selectively receive compressed air from a compressed air source, and a piston slidably received in the chamber and connected with the plunger, the piston being adapted to slide the plunger through the barrel in response to compressed air being received in the chamber.

18. A combined manual and pneumatic fluid dispensing system comprising:

a self contained fluid pump adapted to be placed in fluid communication with a source of fluid and to both draw fluid from the source and deliver the drawn fluid under pressure;

a fluid dispensing gun adapted to receive fluid at a first pressure and to receive compressed air, and to selectively dispense a predetermined quantity of fluid received by the gun at a second pressure greater than the first pressure;

a first fluid communication means communicating the fluid dispensing gun with the fluid pump; and a second fluid communication means communication the fluid dispensing gun with a source of compressed air;

the fluid pump being a manually primed pump having a cylinder with a manually displaceable piston slidably received in the cylinder and a spring between the piston and cylinder, the piston being adapted to be manually displaced against the spring bias to a first position to draw fluid into the cylinder and prime the pump, and the piston being adapted to be displaced to a second position by the bias of the spring to force fluid drawn into the cylinder out of the cylinder and into the first fluid communication means.

* * * * *